US007765469B2

(12) United States Patent
Sembower et al.

(10) Patent No.: US 7,765,469 B2
(45) Date of Patent: Jul. 27, 2010

(54) SYSTEM AND METHOD FOR PRODUCING VARIABLE INFORMATION DOCUMENTS USING UNDETERMINED DATA SOURCES

(75) Inventors: Neil Sembower, Webster, NY (US); Barry Glynn Gombert, Rochester, NY (US); Lee C. Moore, Rochester, NY (US); Judith A. Slein, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 730 days.

(21) Appl. No.: 11/204,818

(22) Filed: Aug. 16, 2005

(65) Prior Publication Data

US 2007/0041035 A1    Feb. 22, 2007

(51) Int. Cl.
    *G06F 17/00*    (2006.01)
(52) U.S. Cl. .................. 715/243; 715/235; 707/708
(58) Field of Classification Search .............. 715/235, 715/243; 707/3, 608
    See application file for complete search history.

(56) References Cited

U.S. PATENT DOCUMENTS

| | | | |
|---|---|---|---|
| 6,476,931 | B1 | 11/2002 | Aizikowitz et al. |
| 6,507,848 | B1 | 1/2003 | Crosby et al. |
| 6,763,500 | B2 | 7/2004 | Black et al. |
| 6,826,626 | B1 | 11/2004 | McManus |
| 7,139,814 | B2 * | 11/2006 | Dinovo ................ 709/219 |
| 2001/0047369 | A1 | 11/2001 | Aizikowitz et al. |
| 2002/0049702 | A1 * | 4/2002 | Aizikowitz et al. ........ 707/1 |
| 2003/0074419 | A1 | 4/2003 | VanderDrift |
| 2003/0107766 | A1 | 6/2003 | Ramot et al. |
| 2003/0126136 | A1 * | 7/2003 | Omoigui ............... 707/10 |
| 2004/0054672 | A1 * | 3/2004 | Tsuchitani et al. ......... 707/3 |

OTHER PUBLICATIONS

Obasanjo, Dare, "XML Namespaces and How They Affect XPath and XSLT", Extreme XML, MSDN Library May 20, 2002 http://msdn.microsoft.com/en-us/library/ms950779.aspx.*
Hall, Marty. Servlet Tutorial: JavaServer pp. (JSP) 1.0, Copyright 1999, Archived Feb. 8, 2004 http://web.archive.org/web/*/http://www.apl.jhu.edu/~hall/java/Servlet-Tutorial/Servlet-Tutorial-Overview.html.*
Carvin, "Tim Berner-Lee: Weaving a Semantic Web", EDC Center for Media & Comm., Aug. 2005.
Berners-Lee et al., "The Semantic Web", Scientific American, May 2001.

* cited by examiner

*Primary Examiner*—Adam M Queler
(74) *Attorney, Agent, or Firm*—Carter, DeLuca, Farrell & Schmidt, LLP

(57) ABSTRACT

A system and method is provided for printing variable information documents including processing a VI request which has a dynamic reference and uses a namespace and schema, wherein the dynamic reference specifies information to be integrated into a resolved document. The processing includes mapping between respective namespaces and schemas used by a plurality of data sources and the namespace and schema used by the VI request, and generating at least one query in accordance with the dynamic reference and the mapping. The data sources are queried using the generated at least one query. The resolved document is generated and printed, including integrating data received in response to the querying into the resolved document. The data source(s) to be queried may be selected based on a comparison of a type of information available from the plurality of data sources and a type of information requested via the dynamic references.

21 Claims, 3 Drawing Sheets

SYSTEM AND METHOD FOR PRODUCING VARIABLE INFORMATION DOCUMENTS USING UNDETERMINED DATA SOURCES

BACKGROUND

This disclosure relates generally to a system and method for producing variable information documents, and more particularly to a system and method for processing a variable information request which declares an intent for variable information, resolving the variable information request and producing a resolved electronic variable information document.

Creation of variable information (VI) documents is typically a complicated procedure in which variable information languages and tools are implemented. The VI documents are generally created in a print shop, where the author of a VI document must be familiar with the VI languages and tools available in order to create the VI document. Furthermore, data sources providing the variable information are limited. Creation of a VI document may include creating a document template in which at least one field is a dynamic field.

Producing the VI document includes retrieving data from at least one data source for resolving the at least one dynamic field and including the retrieved data in the document. Typically, the data source(s) available for resolving the at least one dynamic field are predetermined as the document template is created, and knowledge about the data source(s) is used when constructing the document template. A multitude of public data sources are available in today's information rich society. Such data sources may be dynamic in that new data sources become available and existing data sources expand, become unavailable or change configurations. However, a user developing a document template for a VI document typically is restricted to accessing data in one or more predetermined data sources from which to retrieve data to be used in the VI document.

Additionally, currently in order to print information found on the World Wide Web a web-aware client application program is used that allows users to search for and access documents on the World Wide Web. Using a protocol, such as hypertext transport protocol (HTTP), the application reads, interprets and displays documents found on the web written in a markup language, e.g., Hypertext Markup Language (HTML), and may further convert the HTML document into a printer ready language document which is printable by a traditional printer. The selection of data to print must be performed before requesting that the data be printed, since the printer is limited to handling print requests for printing documents that are already in printer ready language.

SUMMARY

Accordingly, it is an aspect of the present disclosure to provide a system and method for bringing together standard desktop publishing tools, plug-ins to those tools when desired, server side components and processing, and a wide variety of data sources into a cohesive system. The system allows a document author to easily and reliably compose a VI request (e.g., a document template) featuring dynamic content references. The author need not be familiar with the respective data sources accessed, the schema employed by the respective data sources, or how to interface with the respective data sources. Once completed, the VI request may be submitted to an output device, such as a printer or a display device, along with associated arguments. The server evaluates the dynamic content references and resolves them into usable content. The usable content is integrated into the resolved document(s) using a style and/or layout which may be described in the dynamic output format references of the VI request. Finally, a resolved document including the content and using any output formatting characteristics described by the VI request is output, e.g., printed or displayed.

In one embodiment of the disclosure, the system allows the author to use existing and well known desktop publishing tools and plug-ins to those tools for generating the VI request in the form of a document template, and to simplify the complexity of dynamic content specification and evaluation. The plug-ins may be extensible for increasing levels of features and functionality. The server side may also be extensible, providing dynamic content handlers which decouple data sources from document authoring. The server provides data handlers for interfacing to the respective data sources and collecting the desired content. Furthermore, the server provides mappings for mapping of schemas and instance documents to isolate the VI request from changes in the structure of the data sources.

In accordance with one aspect of the present disclosure, there is provided a printer system for printing variable information (VI) documents. The printer system includes I/O components receiving a VI request having at least one dynamic reference and using a namespace and schema, and facilitating data communication with a plurality of data sources, wherein the at least one dynamic reference describes information to be integrated into at least one resolved document. The printer system further includes at least one processor for processing the VI request for resolving the VI request into the at least one resolved document, and a data handler including a series of programmable instructions executable by the at least one processor. The data handler includes a mapping module for mapping between respective namespaces and schemas used by the plurality of data sources and the namespace and schema used by the at least one dynamic reference of the VI request; a query handler for generating at least one query in accordance with the at least one dynamic reference and the mapping for querying at least one data source of the plurality of data sources, and for querying the at least one data source using the generated at least one query; and an output handler for generating the at least one resolved document including integrating data received in response to the querying into the at least one resolved document. The printer system further includes a printing device for receiving the at least one resolved document from the at least one processor and printing the at least one resolved document.

Pursuant to another aspect of the present disclosure, there is provided a method for printing VI documents. The method includes processing a VI request which has at least one dynamic reference and uses a namespace and schema, wherein the at least one dynamic reference includes an intent declaration describing at least one of a characteristic of output formatting and a characteristic of content being requested for integration into at least one resolved document. The processing includes comparing a type of information available from a plurality of data sources and a type of information requested via the intent declaration; selecting at least one data source from the plurality of data sources in accordance with results of the comparison; transforming the description of the at least one characteristic into a format suitable for inclusion in a query; generating at least one query in accordance with the results from the transforming; querying the selected at least one data source using the generated at least one query; and generating the at least one resolved document including integrating data received in response to the querying into the at least one resolved document. The method further includes printing the at least one resolved document.

Pursuant to still another aspect of the present disclosure, there is provided a server for resolving variable information (VI) documents. The server includes I/O components receiving a VI document template having at least one dynamic reference and using a namespace and schema, facilitating data communication with a plurality of data sources, wherein the at least one dynamic reference describes information requested to be integrated into at least one resolved document. The server further includes at least one processor for processing the document template for resolving the document template into the at least one resolved document; and a data handler including a series of programmable instructions executable by the at least one processor. The data handler includes a mapping module mapping between respective namespaces and schemas used by the plurality of data sources and the namespace and schema used by the at least one dynamic reference of the document template; a query handler for generating at least one query for querying at least one data source of the plurality of data sources in accordance with the at least one dynamic reference and using the mapping, and for querying the at least one data source using the generated at least one query; and an output handler generating the at least one resolved document and integrating data received in response to the querying into the at least one resolved document.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

Figure 1:
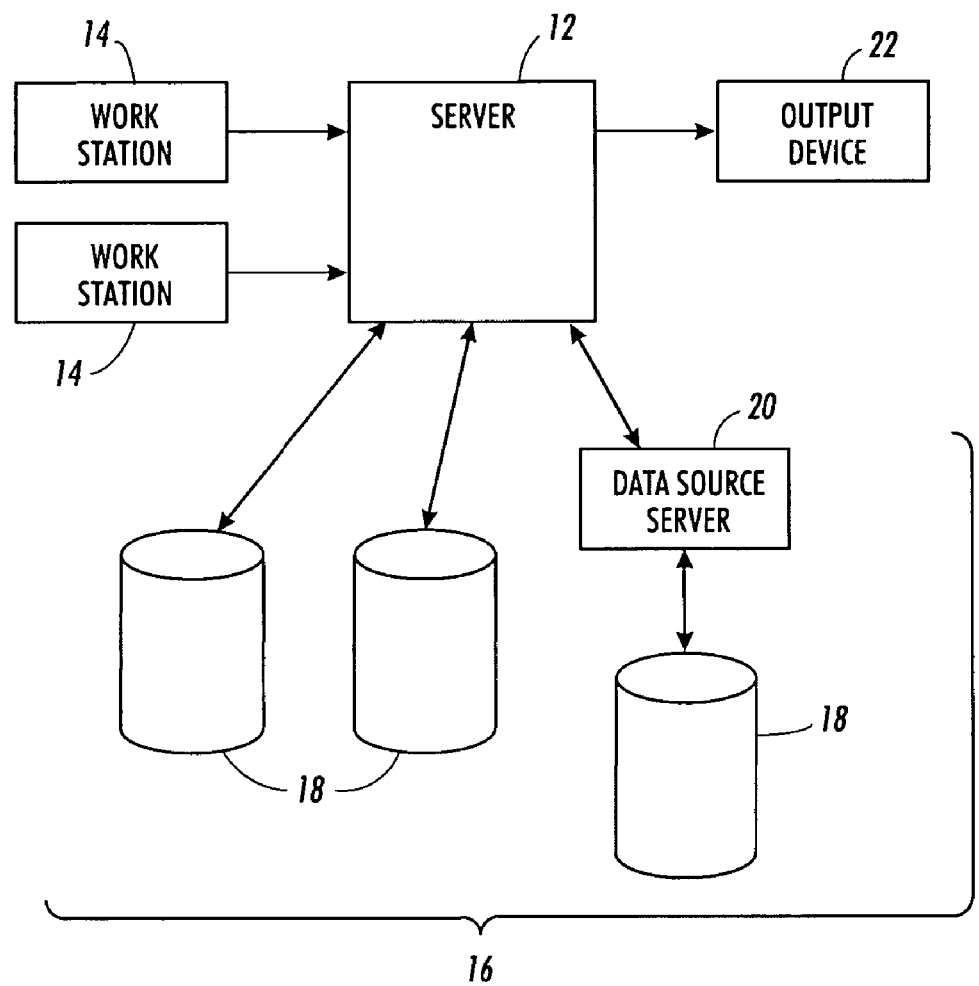
FIG. 1 is a block diagram of a document production, system for producing variable information documents in accordance with the present disclosure.

For a general understanding of the features of the present disclosure, reference is made to the drawings. In the drawings, like reference numerals have been used throughout to identify identical elements. With reference to FIG. 1, a document production system 10 for processing dynamic variable information (VI) requests is shown. The system 10 includes a server 12 in operative communication with at least one workstation 14 for receiving a dynamic VI request which is a data request, having at least one dynamic reference. When the user of the workstation 14 submits the VI request to the server 12, the user is implicitly submitting a request to the server 12 to process and resolve the VI request into at least one static document, also referred to as a resolved variable information document, or a resolved document. The VI request may be in the form of a file, a data package, or other form of data that is transmitted. The VI request may be a file in the form of a document template, such as generated by a word processing or desktop publishing application accessible by the workstation 14 (which may be outside of the document production system), another type of file generated by another software application accessible by the workstation 14 (which may be outside of the document production system), or a file generated by an application provided by the document production system 10.

Resolving the VI request includes processing the dynamic reference for retrieving data from a data source and integrating the retrieved data into the at least one static document. The server 12 accesses a pool of data resources 16 including at least one data source 18 and/or at least one data source server 20 providing access to a data source 18 for retrieving data to be used for resolving the dynamic VI request. The resolved document(s) are returned to the requesting workstation 14, such as for a print preview, and/or output to at least one output device 22, e.g., a printer, to complete production of the resolved document. The server 12 communicates with the at least one workstation 14, the output device 22, the data sources 18 and the data source server 20 via a communication medium, such as a wired connection, a network (e.g., the Internet or an intranet), telephone wires, fiber optic communications, wireless connections (e.g., radio frequency, cellular connections, infrared connectivity, etc.) or a combination thereof. The server 12 may operate with multiple workstations 14 in a server/client relationship, where, for example, a user of a workstation 14 may subscribe to the service provided by the server 12 or pay a fee per job.

A VI request includes at least one dynamic reference and may further include arguments associated with the respective at least one dynamic reference. The dynamic reference may include a dynamic content reference or a dynamic output format reference. The dynamic content reference requests data to be included in the content of the resolved document, and the dynamic output format reference requests output formatting properties such as style and/or layout for formatting the appearance of the resolved document upon printing or displaying of the resolved document.

The dynamic reference may include at least one intent declaration, as described further below, and/or several options for content or output formatting, where a selection from the several options is made in accordance with dynamic information retrieved from the data sources 18. The VI request may further include primitives specifying specific layout and style. Also provided with the VI request (or retrieved by the server 12 from the workstation 14 that submitted the VI request) may be data pertaining to the respective workstation user and/or the workstation 14.

The server 12 processes the VI request, including resolving the dynamic references and generating at least one static resolved document having static content. The server 12 accesses the at least one data source 18 (which may include via a data source server 20) for retrieving information to be used for resolving the dynamic references. The server 12 may generate a query that is used to request and retrieve the data from a data source 18 selected by server 12, or the server 12 may request the information from a selected data source server 20 which will retrieve the information from an associated data source 18 and provide the requested information to the server 12. Once the static document is generated by the server 12, the server 12 outputs the static document. The static document is output in an appropriate format and via an appropriate protocol to at least one output device 22, e.g., a printer, a storage device or a display device, and/or may be returned to the respective workstation 14, such as for display thereof.

The workstations 14 each include a processing device for generating the VI request. For example, the respective workstations 14 may be a PC, a cellular phone, a PDA, etc. The workstation 14 may be remote from the server 12 or integrated into the server 12, which may include sharing one or more processing devices with the server 12. A user of the workstation 14 uses a software tool, e.g., a desktop publishing tool, a browser and/or a graphical user interface provided by the server 12 (e.g., by running an application provided by the server 12 on the workstation 14), which is available to the workstation 14 for generating the VI request. For example, when the VI request is a document file (e.g., a document template) a commercial off the shelf editor which supports XML editing with foreign namespaces may be used to generate and edit the document template as an XML document, where a namespace used is the set of names in a naming system. Existing features of the editor may be used to generate the static portions (e.g., markup) of the document template.

Additionally, plug-ins may be provided for the editor, where a plug-in is an add-on file including data and/or a software program which may interact with the editor for enhancing operation of the editor. The plug-ins may provide a user-friendly capability to the user for editing XML content from foreign namespaces and for simplifying dynamic content specification and evaluation. The plug-ins may be extensible for allowing the addition of new features and functionality. It is also envisioned that the document template may be generated using raw XML without the use of a plug-in.

A VI request which was generated by a workstation 14 is transmitted from the workstation 14 to the server 12. Communication between the workstation 14 and the server 12 for transmission of the VI request may be wired or wireless, and in accordance with a suitable method of data transmission, such as in accordance with a predetermined communication protocol that is compatible with both the workstation 14 and the server 12.

The data sources 18 and/or data source servers 20 respond to requests from the server 12 for information by providing requested data. The data sources 18 and/or data source servers 20 may be related and/or linked to one another and/or use the same or similar schemata where a schema of a data source defines organization, element names, formatting rules and/or structure of the data source 18, such as by providing a structural model that defines how information is represented in the directory database. The schema may define the structure of the database, the names of the objects in it, and the attributes of those objects, where an attribute may hold values that may need to conform to a particular syntax or range of values.

The data sources 18 and/or data source servers 20 may be unrelated to one another and/or use different schemata from one another. Furthermore, the data sources 18 and/or data source servers 20 may be configured for receiving requests for information in formats and/or via protocols which are different from one another. Additionally, the namespaces used by the workstation 14, server 12, the various data sources 18 and/or the various data source servers 20 may be different from one another. An extensible markup language (XML) namespace is typically a collection of element types and attribute names, which may commonly be given the name of a Uniform Resource Identifier (URI).

The respective data sources 18 and/or data source servers 20 (in conjunction with the data sources served by the data source servers 20) may be configured, for example, as a web server or service, an XML database, a relational database, a web page, a Web-based Distributed Authoring and Versioning (WebDAV) file or web page, an RSS enabled file or web page (where RSS refers to Rich Site Summary, Resource Description Framework (RDF) Site Summary or Really Simple Syndication, or a content management system), a semantic web (described further below), etc.

Data resources of the system 10 may evolve as the system 10 matures. For example, new data sources 18 and/or data source servers 20 may become accessible by the server 12. Furthermore, the schema used by a particular data source 18 or data source server 20 may evolve and change. The data sources 18 are not controlled by the server 12. While the changes may affect the final output, e.g., the resolved document in file or printed form, the changes may be transparent to the user of the workstations. The user may author the VI request without being aware of the existence of or the namespace or schema used by the actual data sources 18 from which requested information is obtained, or other requirements for communicating and retrieving information from the data sources 18 and/or data source servers 20.

Figure 2:
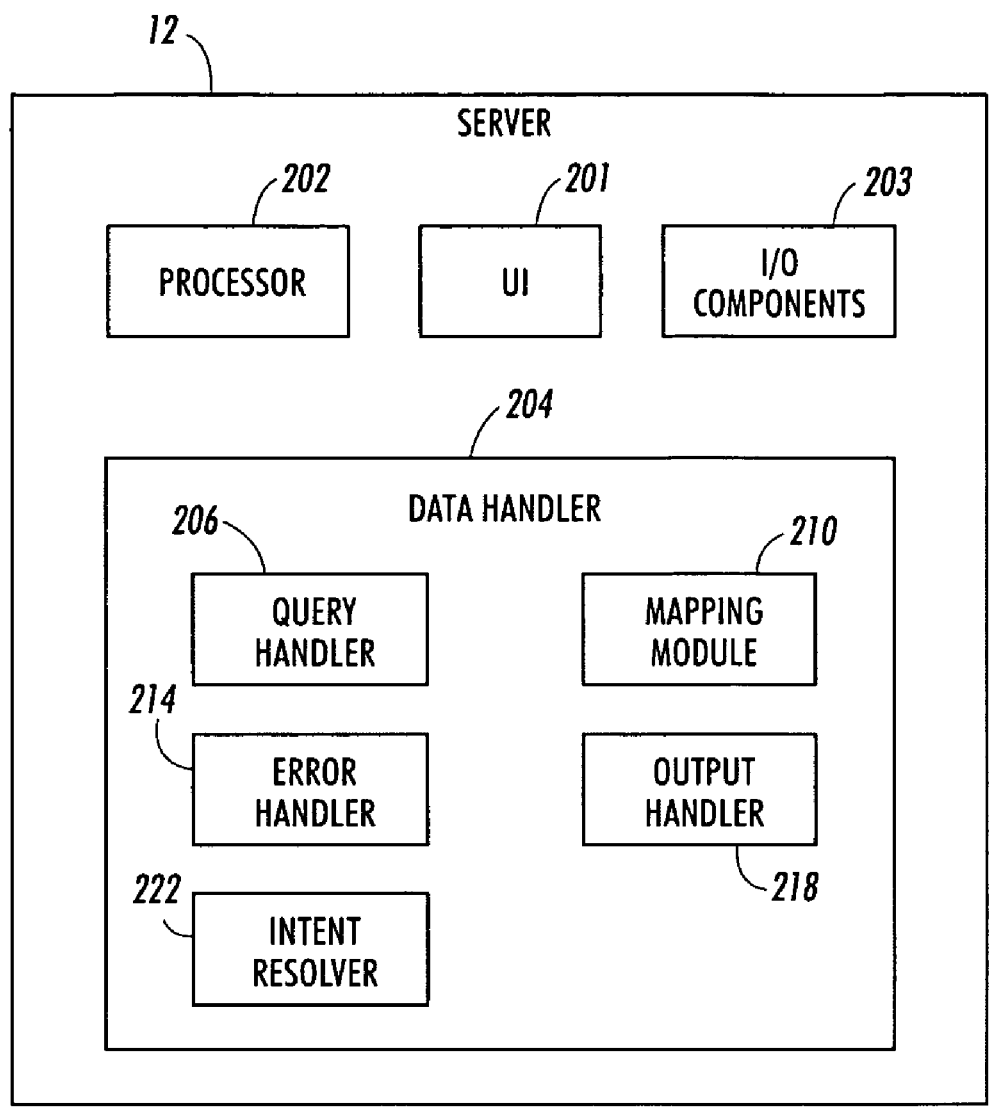
FIG. 2 is a block diagram of a server of the document production system shown in FIG. 1.

With respect to FIG. 2, the server 12 includes at least one processor 202, I/O components 203 for facilitating communication with the workstation 14, pool of data resources 16 and the output device 22; and a data handler 204 which interfaces with the data sources 18 and/or data source servers 20. The server 12 may further include a user interface (UI) module 201 including a series of programmable instructions which are accessible and executable by the processor 202 for generating a user interface, such as a graphical user interface (GUI) which may be displayed on the workstation 14 for allowing a user to generate and submit a VI request. The GUI may be provided on the workstation 14 by executing an application provided by the server 12 on the workstation 14. The server 12 may be integrated with the output device 22, such as a printer, which may include sharing processing resources. A workstation user sends a VI request to the server 12 with a request to resolve the VI request and optionally print the resolved document(s) which the server 12 receives e.g., via the I/O components 203.

The server 12 accesses the pool of data resources 16 via the I/O components 203 for resolving the VI request into one or more resolved documents and provides the resolved document(s), e.g., via the I/O components 203, to the output device 22. Where the output device 22 is a printer, the user may request resolving of the VI request and printing of the resolved documents in one step by submitting the VI request to the server 12, the printer, or an integrated server 12 and printer. The printer may recognize when a received print request is for a VI request, and may send a request and the VI request to the server 12 to resolve the VI request. The server 12 provides the resolved VI document(s) in printer ready form to the printer for printing thereof.

When the VI request is a document template, the dynamic references are recognizable to the server 12 as dynamic references that are distinguishable from other text that is included in the document template which does not have to be resolved. For example, the dynamic references may be delimited by predetermined characters. The server 12 may make an initial pass through the document template for locating each dynamic reference. The server 12 resolves each dynamic reference and inserts retrieved content information corresponding to each dynamic content reference into the resolved document in a location and in an output format (e.g., using style and layout) that is appropriate in accordance with the location of the corresponding dynamic content reference, retrieved output format information or conditions corresponding to each dynamic output format reference, and/or layout and/or style primitives included in the VI request.

When a user indicates that he would like to generate and submit a VI request, the UI module 201 is notified and provides the user with a GUI (e.g., by providing and/or activating an application to execute on the workstation for providing the GUI). The user may be operating from a workstation 14 (e.g., a personal computer or PDA) or at a console of the printer. The GUI provided by the UI module 201 allows the user to enter a VI request, such as by entering text. In one embodiment of the disclosure, the user may enter the dynamic references(s) of the VI request in the form of natural language or in accordance with a predetermined protocol. The UI module 201 may further support interactive transactions between the user and the server 12. For example, the UI module 201 may process information that was entered and ask the user for additional information, and/or provide the user with a list of selections from which to select a choice. The GUI allows the user to submit information to be included in the VI request, upon which a VI request is generated that includes the information, and the VI request is submitted to the server 12.

The UI module 201 may reside on the workstation 14. Also, as discussed above, the user of the workstation may use a commercial off the shelf editor that is executed by the workstation 14 for generating the VI request, such as in the form of a document template. Once the VI request is generated, the user may request that the workstation 14 submit the VI request to the server 12.

The data handler 204 includes a series of programmable instructions and/or data executable by the at least one processor 202. The data handler 204 includes a query handler 206, a mapping module 210, an error handler 214 and an output handler 218. The query handler 206 interprets dynamic content references from a submitted VI request, selects one or more data sources 18 (which may include selecting one or more data source servers 20) from which to retrieve information, such as in accordance with a comparison of a type of content available from the data sources 18 and a type of content requested via the at least one dynamic content reference, and/or predetermined ratings which rate the data sources 18.

The query handler 206 generates at least one query, such as an SQL statement, which it uses to query the selected data sources 18 in accordance with the dynamic content references. The queries are formatted in a format which is intelligible to the selected data source(s) 18 or data source server(s) 20, where the formatting may include marshalling parameters. The query handler 206 further accesses the mapping module 210 for generating the queries, as described further below. The query handler 206 further receives, e.g., accesses or retrieves, data provided by the data sources 18 in response to the queries. Additionally, the query handler 206 may select data from the data received in response to the queries which is to be integrated into the resolved document(s), such as in accordance with determined quality of the received data, time resources consumed, processing resources consumed, availability of the data sought after, success status of query and/or receiving a response to the query, predetermined ratings which rate the data source 18 providing the data, etc.

The mapping module 210 reconciles namespaces including mapping the namespace used by each of the data sources 18 or data source servers 20 which provide information to be incorporated into the resolved document into the namespace used by the VI request and resolved document. A mapping procedure is performed by the mapping module 210 for converting between the schema of the data source 18 or data source server 20 and the schema of the VI request and/or the desired schema of the resolved document. The mapping module 210 parses a VI request, such as a dynamic reference and/or an intent declaration (described below), for generating at least one corresponding query. The error handler 214 handles errors caused or generated as the server processes the VI request and generates the resolved document.

The output handler 218 integrates and formats content received (e.g., retrieved) from the data source(s) 18 and data source server(s) 20 into the resolved document using output formatting properties (e.g., style and layout) specified by the VI request. The style and/or page layout may be specified in the VI request via one or more dynamic output format references that specify, for example, from where to retrieve a respective output format specification, or describe information to be retrieved for determining an output format specification. The dynamic output format references may include operators including page layout primitives for specifying layout for the dynamic information only, or layout intent declarations (described below), which may include layout options which are selected by resolving dynamic data.

The layout intent declaration is a statement describing characteristics of the output format of the document, which essentially describe what the author would like a document to look like in a broad range of conditions, rather than a literal statement of how a page should look. For example, a layout intent declaration may state that for a page having an image and text, the text should be printed to one side of the image. In contrast, a literal statement of how the page should look specifies image width and text borders for the printed text. The layout intent declaration enables the user to describe how the resolved document should look without knowing sufficient information about the data being printed, such as the size of the image relative to the image region allocated for the image. The intent declaration provides sufficient information for handling variable size images. However, a literal intent specification would not be prepared to handle a condition in which a large image overflowed from the allocated space, or the image was substantially smaller than the allocated space. Accordingly, by using the layout intent declarations, layout options may further be resolved in accordance with dynamic data, such as for mapping dynamic data conditions onto a given set of layouts.

The following are two examples of dynamic data conditions. Example 1: if data source A returns valid data then use layout option B, else use layout option C. Example 2: if data source A returns XML in a known namespace then refer layout of A's data to A's handler, else use a default layout.

The output handler 218 uses the layout primitives and retrieved information relating to output formatting described by each dynamic output format reference to resolve the resolved document including creating the final style and layout of the page(s). It is envisioned that the layout primitives may manage most of the page layout. The output handler 218 further formats the resolved document into an appropriate format for the output device 22. For example, the resolved document may be converted into a printable language, such as PDF, Postscript™ or HyperText Markup Language (HTML), Microsoft's Metro™ or a displayable language, such as HTML.

The output handler 218 may determine the style and layout for the resolved document without using layout primitives. For example, the VI request may include incomplete layout primitives or may not have any layout primitives at all. Additionally, the VI request may have dynamic output format references that only partially describe the output formatting to be used, or may not have any dynamic output format references at all. The output handler 218 may determine all or a portion of the output formatting (e.g., style and layout) of the resolved document by consulting personal data or history data associated with the user and/or selecting a style and layout that is suitable for the requested content of the resolved document.

For example, when a user submits a VI request requesting recipes for potatoes, the recipes to be included in the resolved document may be laid out in a style and layout that is conventional for recipes. Furthermore, the output handler 218 may allow the user to enter layout and style choices interactively via the GUI presented by the UI module 201. For example, the output handler 218 may present the user with selections to choose from via the GUI to allow the user to select between a style and layout for printing the recipe on a recipe card having predetermined dimensions or on a standard letter size sheet of paper.

Depending on the nature of the dynamic references in the VI request, the output handler 12 may resolve the VI request into one instance of the resolved document or into multiple instances of the resolved documents. The VI request specifies that a new instance of a resolved document should be generated for respective different content values or output formats as resolved for the dynamic reference, such as when the results from a query include multiple values or output formats, with respective values or formats corresponding to a different resolved document instance. For example, the dynamic content reference may be resolved for respective names on a list of names where each instance of the resolved document is resolved with a different name.

Multiple query handlers and mappings may be provided, where each query handler and mapping may be configured for interfacing with a specific data source 18 or data source server 20 which uses a particular namespace that is foreign to the namespace of the VI request. Advantageously, a workstation user authoring a VI request need only be familiar with a single namespace and schema, and need not be familiar with the namespace, schema or existence of existing data sources 18 or data source servers 20.

Furthermore, the server 12 is updated to accommodate changes to the data resources, and the user need not be aware of changes to the data resources, such as changes to the namespace or schema of existing data sources 18 or data source servers 20, or the addition of new data sources 18 or data source servers 20. The query handlers and mappings may be written and updated in Extensible Stylesheet Language (XSL), while the author of the VI request (e.g., VI document template) need not be familiar with XSL. The query handlers and mappings provided for each of the data sources 18 and data source servers 20 is typically well defined and testable independent of VI requests. Generation and maintenance of the query handlers and mappings typically does not expose secure or proprietary information stored by the VI request or the data sources 18. Accordingly, maintenance of the server 12, and more specifically the mappings, may be performed by an administrator having XSL skills without exposing the administrator to secure or proprietary information.

The query handler 206 further includes an intent resolver 222 which processes dynamic content references in the VI request that include intent declarations. The intent declarations may be content intent declarations that describe characteristics of content which the user intends to be included in the resolved document without referencing the content and/or the data source 18 and/or data source server 20, or instructing how to fetch the content. The layout intent declarations describe characteristics of the output formatting (e.g., layout and style) to be applied to the resolved document without literally specifying the output format, and providing for the final output format to be determined in accordance with dynamic data, without specifying the data source 18 and/or data source server 20 or instructing how to fetch the dynamic data. The dynamic data may be included in dynamic content described by the dynamic content reference, or may be specified by the layout intent declaration.

The query handler 206 processes a dynamic content reference to determine whether it includes an intent declaration, and if so, requests that the intent resolver 222 process the dynamic content reference. Accordingly, the intent declaration is resolved at runtime by comparing a type of information available from the data sources 18 and a type of information requested via the intent declaration, and selecting at least one data source 18 in accordance with results of the comparison. The intent declaration is transformed into a format suitable for inclusion in a query. The selected at least one data source 18 is queried using the transformed intent declaration.

The format for an intent declaration may be similar to a job definition format (JDF), which is an XML-based format for workflow and control information. The intent declarations are expressed using an intent vocabulary which may be represented by an XML schema. The user authoring the intent declaration does not need to be familiar with the available data sources 18 and/or data source servers 20, their namespaces or schemas.

The intent resolver 222 resolves the intent declaration by searching the pool of data resources 16 for suitable suppliers of information from the data sources 18 and/or data source servers 18, retrieves information from the selected suppliers and selects data from the retrieved information which best satisfies the request. Different techniques may be used for searching for, accessing and acquiring content, such as web crawler or spiders, directory services, databases, or semantic techniques (e.g., an RDF query language, such as RDF Query Language (RQL) or SPARQL).

Additionally, the intent resolver 222 and/or query handler 206 may interpret the intent declaration by using contextual information, such as data related to the user, the time of the request, the workstation 14. Data related to the user, for example, may include personal data about the user (age, gender, profession, etc.), historical data regarding the user's prior computing activities, historical data regarding previous VI documents authored by the user, etc. The contextual information may be used for selecting the data to be included in the resolved document, and for determining how the data will be expressed or presented. For example, when a user submits a VI request requesting recipes for potatoes, the intent resolver 222 and/or query handler 206 may determine from personal data about the user that the user is lactose intolerant, and that the user is operating a workstation 14 located in England. The intent resolver 222 and/or query handler 206 selects recipes that are to be included in the resolved document to be dairy free, and the ingredients of the recipes are expressed in metric units, including converting the units when necessary. Accordingly, in a workflow in which documents are produced at various stages, a printer integrated with a server 12 having an intent resolver 222 functions as a data sink.

The pool of data resources 16 may include an ontological framework. For example, the pool of data resources 16 may be included in the Semantic Web, which is based on an ontological framework employing formal semantics which define the meaning of information; structure which formalizes the organization of the information; and syntax which is an ontology defining ways to communicate with the information. In "The Semantic Web", by Tim Berners-Lee, James Hendler, Ora Lassila, *Scientific American*, May 2001, the Semantic Web is described as "an extension of the current web in which information is given well-defined meaning, better enabling computers and people to work in cooperation". Ontology-based tools and techniques are being applied to better manage and organize information on the Semantic Web and the World Wide Web.

The server 12 and output device 22 use ontology-driven knowledge management for better managing and using information, including using extended semantics for becoming an active participant in the Semantic Web. The query handler employs ontology-driven knowledge management to query the Semantic Web for finding content requested in the intent declaration. A printer in combination with a server 12 using ontology-driven knowledge management tools for actively participating in the Semantic Web is herein referred to as a semantic printer. Rather than receive and print a web page, the semantic printer searches for and accesses information in order to resolve intent declarations, where the intent description use the formal semantics, structure, and syntax (ontology) of the Semantic Web. The semantic printer streamlines preparation and generation of a resolved variable information document, while providing an alternative to obtaining desired content from an Internet search result list. In a workflow, documents are often produced at various stages of the flow; with printers functioning as a data sink. When the printer is a semantic printer acting as an active participant in the Semantic Web, the printer is able to locate and select content from the vast amount of information available on the Internet using the ontological framework provided by the Semantic Web.

The semantic printer may further process intent declarations expressed in natural language. For example, the semantic printer may process the intent declaration "I would like a complete report on the price of eggs in Russia during the time of the German depression." Processing the intent declaration may include obtaining and aggregating content which is available on the Semantic Web from sources selected in accordance with the content of the intent declaration, selecting and filtering content from the aggregated content to be included in the resolved document, and/or for applying output formatting to the selected content, which may include selecting style and layout, applying style and layout, and integrating the content into the resolved document using the applied output formatting, and printing or displaying the resolved document for producing an aesthetically pleasing and pertinent resolved document.

Figure 3:
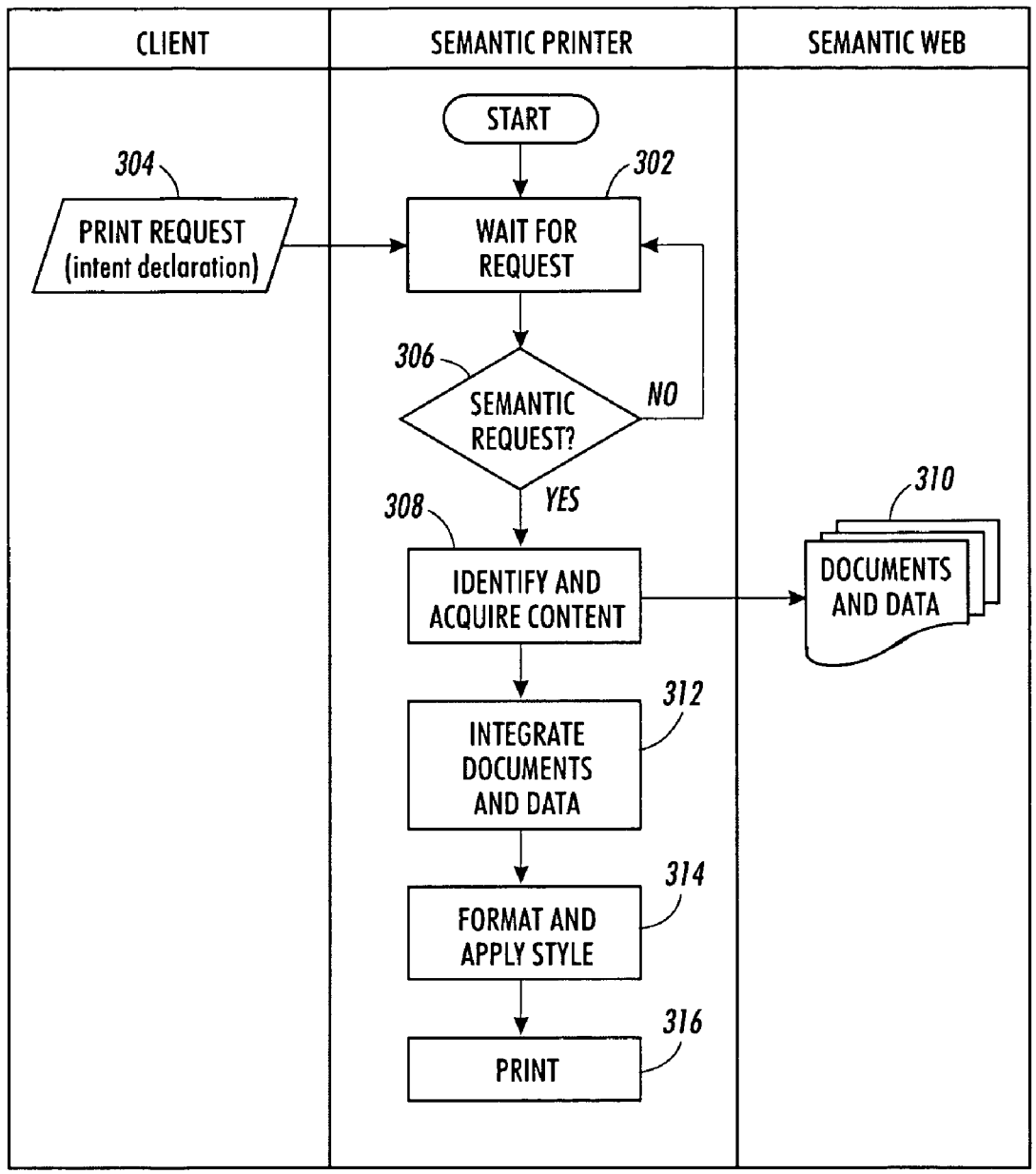
FIG. 3 is a flow diagram of steps performed by a semantic printer in accordance with the present disclosure.

With reference to FIG. 3 a flow diagram is shown for processing of a print request by the semantic printer. At step 302, the semantic printer waits for receipt of a print request 304 including an intent declaration. At step 306, a determination is made if the print request 304 includes a semantic request. If not, the semantic printer executes step 302. If the print request 304 is determined to include a semantic request, step 308 is executed. At step 308, information 310 available on the Semantic Web is accessed, and requested content and/or output layout information is identified, acquired and filtered and/or selected. At step 312, the selected information is integrated into a resolved document, which may include applying the selected style and layout to the selected content using the selected information for resolving the document. At step 314, format and style are applied to the resolved document. At step 316, the resolved document is output, e.g., printed.

Below are three examples demonstrating uses of the semantic printer. For each example, an intent declaration is provided and the actions taken by the semantic provider are described. The resolved intent declaration may make up the resolved document itself, or alternatively, the VI request may include the intent declaration as well as other data (e.g., static data and/or other intent declarations), and the resolved intent declaration is integrated into the resolved document along with the other data.

EXAMPLE 1

Intent Declaration

Print a Phone Book for My Group

Semantic Printer Actions: Accesses an electronic directory (Such as Microsoft Outlook™) of the user's organization and filters data for members of the group of which he is a member which is appropriate for a phone book. The semantic printer formats and styles the filtered data to produce a current, up to date phone list for his group. The printer also knows that the user has a vision impairment and selects a specific font most suitable for the user's needs.

Intent Declaration: Print the top ten recipes for scalloped potatoes.

Semantic Printer Actions: Scours the Semantic Web and discovers the top food critics' recipes for scalloped potatoes. The printer is also aware of the identity of the user and uses this information to determine any dietary restrictions. In this case the user is living in Europe (Poland), is lactose intolerant, and is a vegetarian. Using this information, the closest matching top ten recipes are selected and printed out. The printer translates the recipes (such as by requesting a translation from a website), and formats and styles the translated recipes in a manner common to cookbooks in the user's region of Poland.

Intent Declaration: Print a competitive analysis of published patent applications and granted patents which are related to XML Printing for Company A, Company B and Company C over the past five years.

Semantic Printer Actions: Since the country was not specified, the printer may select one or more countries or organizations of countries, such as in accordance with the user's organizational affiliation or previously submitted requests for patent related analyses. The printer connects to a subscribed service or available database of published patent applications and granted patents for respective countries or organizations, and executes a search in accordance with the criteria provided in the intent declaration. The search results are used to produce a complete competitive analysis that presents the requested information in a manner that supports the user's organization's business processes and objectives.

Advantageously, the use of intent declarations, which describe content rather than referencing it, and the provision of the intent resolver 222 provides the benefit of decoupling between the VI request and the data sources. The intent resolver 222 residing on the server resolves the intent declaration at run time. Adaptation to changes to the data sources 18, which may include the provision of additional data sources 18, removal of data sources 18, and/or semantic, structural and/or ontological changes to existing data sources 18, are handled by the intent resolver 222 and may remain transparent to the user.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software, or a combination thereof. The word "printer" as used herein encompasses any apparatus, such as a digital copier, bookmaking machine, facsimile machine, multifunction machine, etc., which performs a print outputting function for any purpose.

The invention claimed is:

1. A system for resolving variable information (VI) documents comprising:
I/O components for receiving a request including a document having data and a dynamic reference and a request to resolve the document, wherein the dynamic reference indirectly references content to be integrated into the document with the data, wherein the indirect reference references by describing at least one characteristic of the content, and for communicating with a plurality of data sources;

at least one server at least one tangible processor;

a series of programmable instructions executable by the at least one processor for processing the request comprising:

a mapping module for mapping between respective namespaces and schemas used by the plurality of data sources and a namespace and schema used by the dynamic reference;

a query handler for:

comparing subject matter of content available from the plurality of data sources and subject matter of the content described by the indirect reference of the dynamic reference;

selecting at least one data source from the plurality of data sources to query in accordance with the comparison;

generating at least one query in accordance with the dynamic reference and the mapping;

querying the selected at least one data source using the generated at least one query; and an output handler for integrating data received in response to the querying with the document in order to generate at least one resolved document that has the data originally in the document and data received in response to the querying.

2. The system according to claim 1, wherein the dynamic reference includes a dynamic content reference describing content to be integrated into in the at least one resolved document.

3. The system according to claim 2, wherein the dynamic reference includes a dynamic output format reference describing output formatting properties to be used for formatting the at least one resolved document to accommodate a variety of possible conditions related to the data being integrated, including providing instructions for laying out dynamic data of variable size being integrated, including laying out data received in response to the querying relative to data originally in the document, wherein the instructions accommodate the variable size.

4. The system according to claim 2, wherein the dynamic reference includes a dynamic output format reference describing output formatting properties to be used for formatting the at least one resolved document to accommodate a variety of possible conditions related to the data being integrated, wherein the dynamic output format reference provides for more than one layout option, wherein the layout option to be used is conditional upon result of the querying.

5. The system according to claim 1, wherein the output handler further uses the mapping when integrating data received in response to the querying into the at least one resolved document.

6. The system according to claim 1, wherein the plurality of data sources includes at least one website.

7. The system according to claim 1, wherein the dynamic reference includes an intent declaration describing at least one characteristic of at least one of output formatting and content being requested for integration into the at least one resolved document, and the query handler further includes an intent resolver which processes the intent declaration for transforming the description of the at least one characteristic into a format suitable for inclusion in the at least one query, and the at least one query is generated using the results from the processing by the intent resolver.

8. The system according to claim 7, wherein the intent declaration is in natural language.

9. The system according to claim 1, wherein the VI request is a document template written in XML.

10. The system according to claim 1, wherein the plurality of data sources is included in a Semantic Web, and the query handler queries the Semantic Web.

11. The system according to claim 1, wherein the dynamic reference includes at least one of formal semantics, structure, and syntax used by a Semantic Web.

12. The system according to claim 1, wherein the query handler further selects data from the data received in response to the at least one query for integration into the at least one resolved document.

13. The system according to claim 1, wherein the received request includes a request to print the document, and the system further comprises a printing device for printing the at least one resolved document.

14. A method for resolving variable information (VI) documents comprising:

receiving a request including a document having data and a dynamic reference and a request to resolve the document, wherein the dynamic reference indirectly references content to be integrated into the document with the data, wherein the indirect reference references by describing at least one characteristic of the content;

processing by a tangible processor the request comprising;

mapping between respective namespaces and schemas used by a plurality of data sources and a namespace and schema used by the dynamic reference;

comparing subject matter of content available from the plurality of data sources and subject matter of content described by the indirect reference of the dynamic reference;

selecting at least one data source from the plurality of data sources to query in accordance with results of the comparison;

transforming the description of the at least one characteristic into a format suitable for inclusion in a query;

generating at least one query in accordance with the results from the transforming and the mapping;

querying the selected at least one data source using the generated at least one query; and integrating data received in response to the querying with the document in order to generate at least one resolved document that has the data originally in the document and data received in response to the querying.

15. The method according to claim 14, wherein the dynamic reference includes a dynamic output format reference describing output formatting properties to be used for formatting the at least one resolved document to accommodate a variety of possible conditions related to the data being integrated.

16. The method according to claim 14, wherein the intent declaration is in natural language.

17. The method according to claim 14, wherein the received request includes a request to print the document, and the method further comprises printing the at least one resolved document.

18. The method according to claim 14, wherein the dynamic reference includes a dynamic output format reference describing output formatting properties to be used for formatting the at least one resolved document to accommodate a variety of possible conditions related to the data being integrated, including providing instructions for laying out dynamic data of variable size being integrated, including laying out data received in response to the querying relative to data originally in the document, wherein the instructions accommodate the variable size.

19. The method according to claim 14, wherein the dynamic reference includes a dynamic output format reference describing output formatting properties to be used for formatting the at least one resolved document to accommodate a variety of possible conditions related to the data being integrated, wherein the dynamic output format reference provides for more than one layout option, wherein the layout option to be used is conditional upon result of the querying.

20. A system for resolving variable information (VI) documents comprising:

I/O components for facilitating communication with a plurality of data sources and for receiving a request having a dynamic reference, wherein the dynamic reference describes information to be integrated into at least one resolved document without referencing a data source of the plurality of data sources from which to retrieve the information or instructing how to fetch the information;

at least one server at least one tangible processor;

a series of programmable instructions executable by the at least one processor for processing the request comprising:

a mapping module for mapping between respective namespaces and schemas used by the plurality of data sources and a namespace and schema used by the dynamic reference;

a query handler employing ontology-driven knowledge management for:

comparing subject matter of content available from the plurality of data sources and subject matter of content described by the indirect reference of the dynamic reference;

selecting at least one data source from the plurality of data sources to query in accordance with results of the comparison;

generating at least one query in accordance with the dynamic reference and the mapping;

querying the selected at least one data source using the generated at least one query; and an output handler for generating the at least one resolved document including integrating data received in response to the querying into the at least one resolved document in order that the at least one resolved document includes data received in response to the querying.

21. The system according to claim 20, wherein the query handler further compares a type of content available from the plurality of data sources with a type of the information described in the dynamic reference for integration into the at least one resolved document, wherein the selecting by the query handler is in accordance with the comparison.

* * * * *